May 11, 1937. A. PODEL 2,079,813

SEALED PACKAGE AND METHOD OF SEALING

Filed Feb. 27, 1931

INVENTOR
Abraham Podel
BY
Norman N. Holland
his ATTORNEY

Patented May 11, 1937

2,079,813

UNITED STATES PATENT OFFICE 2,079,813

SEALED PACKAGE AND METHOD OF SEALING

Abraham Podel, Bronx, N. Y., assignor to Anchor Cap & Closure Corporation, Long Island City, N. Y., a corporation of New York Application February 27, 1931, Serial No. 518,605

11 Claims. (Cl. 226—82)

The present invention relates to the sealing art, and more particularly to a sealed package and method of sealing.

In sealing food products such as jellies, preserves, vegetables and the like, it is desirable to exhaust the air from the containers, which requires that the products be sealed very hot or sealed in a closed chamber from which the air has been substantially exhausted. In order to facilitate the several operations, it is desirable also to seal the packages directly after they leave the filling machines or the filling stations, thereby requiring a relatively simple sealing mechanism. Certain products require that the material be subjected to a vacuum for a substantial period of time in order to exhaust the air from the interior of the product. While the above features are desirable, a perfect hermetic seal is essential in every instance in order to preserve the product, irrespective of how much the container varies from a predetermined size, or varies in shape. It is well known that glass containers vary in both shape and size from a prescribed standard. Various attempts have been made, in the prior art, to achieve these several advantages without sacrificing the effectiveness of the seal, but these attempts have been only partially successful. In addition, very complicated machinery was necessary in most instances and, in other instances, the effectiveness of the seal was sacrificed in order to achieve some of these advantages.

The present invention aims to eliminate the above difficulties and to provide a secure seal in all cases, which can be made on the containers as they leave the filling machine, or in any other suitable manner. The machine required is less complicated and less expensive than prior art machines and the closure caps may be very readily removed from the containers, which is an additional advantage.

An object of the invention is to facilitate the sealing of glass containers.

Another object of the invention is to provide an improved means and method for securely sealing glass containers.

Another object of the invention is to provide means and a method of sealing glass containers adapted to simplify the necessary machinery and to accommodate a greater range of variation in both size and shape of containers without impairing the effectiveness of the seal.

Another object of the invention is to provide an improved hermetic seal for glass containers.

Another object of the invention is to facilitate the sealing operation by first forming a temporary hermetic seal by the wedging action of the closure cap and container and thereafter reforming portions of the closure to increase the effectiveness of the temporary seal.

Another object of the invention is to provide a sealed package from which the closure cap may be readily removed.

Other and further objects of the invention will be obvious upon an understanding of the illustrated embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, wherein—

Figure 1:
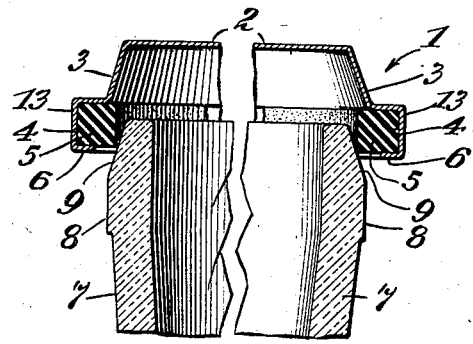
Fig. 1 is a fragmentary sectional view illustrating a preferred embodiment of a cap resting upon the container, ready to be applied thereto.
Figure 2:
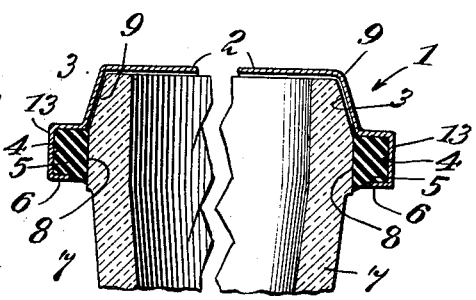
Fig. 2 is a fragmentary sectional view illustrating the relationship of the cap and container shown in Fig. 1 when the cap is forced upon the container.
Figure 3:
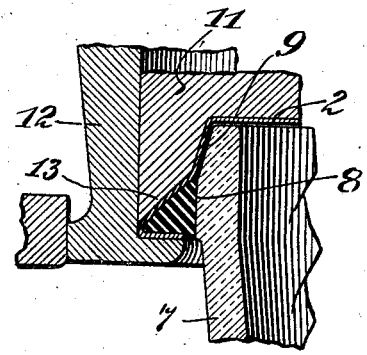
Fig. 3 is a fragmentary sectional view illustrating a sealing mechanism for reforming a cap to provide a permanent seal.

Referring again to the drawing, and particularly to Figs. 1 to 3, thereof, there is shown a closure cap 1 having a cover portion 2 and a depending skirt 3. The skirt of the cap has a bead or annular recess 4 adapted to receive a vulcanized rubber gasket 5 which is supported in the bead by the inturned lower edge 6 of the cap. A preferred embodiment of the container is illustrated at 7 with a cylindrical sealing surface 8 directly adjacent to a bevelled surface 9, leading to the rim or mouth of the container. In Fig. 1 of the drawing, the closure cap is shown resting upon the container prior to the application of the cap to the container. In Fig. 2, the cap is shown forced upon the container to provide a temporary hermetic seal. The size of the cap, as will be noted in Fig. 1, is such that it will seal upon the bevelled surface 9 of the container but will not drop down over the cylindrical surface 8 without the application of downward pressure.

The relative size of the cap, gasket and container are such that the cap will slip on readily and form a temporary seal. However, the temporary fit between the cap and container is not tight enough to render sealing difficult or to require a substantial pressure to apply the cap. The subsequent reformation of the cap is relied upon to make a permanent seal.

The present invention contemplates the use of a small anvil for applying the caps, but, in many cases, the cap may be forced down on the container manually. Preferably, the container, with the cap applied as shown in Fig. 1, passes under a belt, or other mechanical sealing head, which forces the cap onto the container, as shown in Fig. 2. This operation is simple and a suitable sealing mechanism can be mounted adjacent the filling machine to seal the containers as they pass from the filling machine. Preferably, the seal is sufficient to maintain a vacuum in the container for a short period of time. If desirable, the caps may be pressed on in bell-shaped chambers, moving on a rotary table, the bells being dropped over the containers for a substantial period of time as they pass around the table, and the air can be exhausted from the bell prior to the sealing operation.

After the cap has been temporarily sealed to the container, as shown in Fig. 2, it is then passed to a suitable sealing machine which may, for convenience, comprise an anvil 11, adapted to fit upon the upper part of the cap, and sealing jaws 12 adapted to fit over the anvil and to engage the bottom of the skirt of the cap. By relative movement of the jaws 12 and the anvil 11, the bead 4 of the closure cap may be reformed to compress the gasket tightly against the container, as shown in Fig. 3. A preferred construction for the reformed bead is shown in Fig. 3. The outer side 13 of the bead is pressed inwardly at its upper part to reform the upper outer corner of the bead which preferably brings the adjacent sides of the bead into substantially a straight line at said corner, thus eliminating or substantially eliminating said corner of the bead during the sealing operation. The lower portion flares outwardly at a slightly greater angle than the upper portion of the skirt leading to the bead. This forces the gasket downwardly and inwardly against the container to provide a seal on the cylindrical sealing surface 8. In addition, it increases slightly the length of the skirt of the cap, improving the appearance thereof. The lower side of the bead is held firmly against the gasket and is sufficiently wide to support the gasket after it is released by the jaws 12. In addition, the lower side of the cap is spaced a substantial distance from the side wall of the container, thereby facilitating the application of a cap opener or cap removing tool for the removal of the cap. The lower jaw of such a tool will readily engage the bottom of the skirt of the cap and force it from the container. The bevelled surface 9, in addition to facilitating the application of the cap, also facilitates the removal thereof because it minimizes the necessary stretching of the cap to cause it to clear the upper end of the container. The bevelled portion 9 of the container preferably terminates at the upper side of the gasket. While the above bead construction is described as preferred, it will be understood that the invention is not limited thereto except in so far as said features may be included in certain of the claims and that certain features of the invention may be utilized with various bead or skirt constructions.

Figure 4:
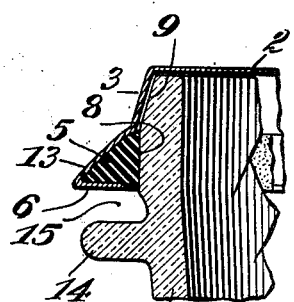
Fig. 4 is a fragmentary sectional view illustrating the seal shown in Fig. 3 applied to a container having a pry-off ledge.

The container shown in Fig. 4 differs from that illustrated in Figs. 1 to 3 in that a pry-off annular shoulder 14 is provided directly below the sealing surface 8 on the container in order to provide a substantial space 15 between the upper part of the shoulder 14 and the bottom of the skirt of the cap. As shown in Fig. 4, the collapsed bead on the cap overlies the ledge 14. A housewife may insert a coin or a knife in the space provided and pry the cap from the container. This facilitates the opening operation and eliminates the necessity for special tools.

Figure 5:
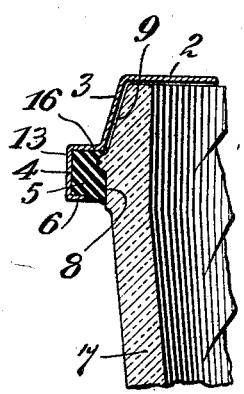
Fig. 5 is a fragmentary sectional view of a closure cap forced upon a container having a bead at the upper part of the sealing zone.
Figure 6:
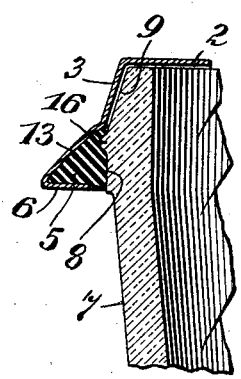
Fig. 6 is a fragmentary sectional view showing the bead of the cap reformed to force the gasket tightly against the container.

Certain types of food products require sterilization after they have been sealed in glass containers. This operation heats the product within the container and forms a pressure therein tending to blow off the caps. In addition, the heat softens the rubber and impairs the holding power thereof. The container shown in Figs. 5 and 6 is particularly adapted for this type of seal. The bead 16 on the container, at the junction of the bevelled surface 9 and the cylindrical surface 8, engages the gasket and holds the cover or cap firmly in position. The cap may be readily forced over the bead because it is not necessary that the seal on the cylindrical part of the container be secure and permanent. The seal against the bead alone will be sufficient to temporarily retain the vacuum or hermetic seal desired. Thereafter, a chuck similar to that shown in Fig. 3 may be utilized for reforming the bead of the cap, to force the gasket firmly against the bead 16 on the container, as well as the cylindrical sealing surface 8. A wide range of variations in size of containers may likewise be accommodated because the second sealing operation will take up substantial variations in size over and above that possible in the first sealing operation.

Figure 7:
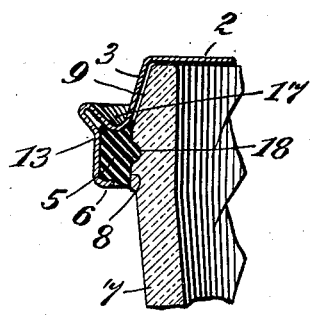
Fig. 7 is a fragmentary sectional view illustrating a slightly different seal applied to a beaded container.

A slightly different seal is illustrated in Fig. 7 of the drawing, applied to a container substantially similar to that shown in Figs. 5 and 6. The seal in Fig. 7 is formed by raising the skirt of the cap slightly, forming a groove 17 in the upper side of the bead, and forcing the entire side of the bead slightly inwardly, with the lower part of the bead extending further inwardly than the upper part, so that the gasket is held firmly against the container at and directly below the bead 16. With this type of seal, the gasket is forced into closest relation with the container at the lower portion thereof.

In sealing containers, the caps may be applied by hand, or by automatic cap feeds, to the containers, as shown in Fig. 1, where the gasket supports the cap and rests upon the bevelled sealing surface 9 of the container. Preferably, the cap rests horizontally, but the size and shape is such that if one side drops down until the cover rests on the rim of the container, the relation of the other side of the cap to the bevelled surface 9 is such that the cap may be forced onto the container by downward pressure. In some cases, the pressure may be applied by hand, but preferably the cap and container are passed under a suitable belt which forces the cap down on the container, or a suitable anvil engages and forces the cap onto the container. This temporary seal, made by forcing the cap on the container, needs to be sufficient only to maintain a hermetic seal for a short period of time; it does not need to be sufficiently permanent to withstand the rough handling to which the jar may be subjected during shipment. For this reason, the pressure required for forcing the cap on the container may be relatively small. After the cap has been applied to the container, as shown in Fig. 2, the containers are fed to a simple sealing machine without sealing chambers which has an anvil 11 and sealing jaws 12, adapted to engage and reform the bead of the cap, as shown more particularly in Fig. 3. Any variations in size of the container which the temporary seal is unable to accommodate will be easily taken care of in the permanent seal. Further, a defective seal made during the first sealing operation is not serious because the time elapsing between the temporary seal and the permanent seal is comparatively short and not sufficient to have any bad effect or to create any tendency for spoilage. By reason of the relatively large gasket and the adjustable sealing mechanism, a very substantial variation in the size of the containers may be accommodated and, at the same time, an effective permanent seal is formed on each container.

It will be seen that the present invention provides a very effective package which may be readily sealed with inexpensive equipment. The temporary seal may be readily made immediately upon the filling of the containers, and the permanent seal can also be made without complicated sealing machinery. The permanent seal insures against any defects in the temporary seal and increases substantially the amount of variation in the size of the container which can be accommodated. The resulting package has a secure seal which is fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of hermetically sealing closure caps to glass containers having side wall sealing surfaces, which method comprises forcing downwardly a cap containing a gasket in the skirt thereof onto the container, the gasket being smaller than the sealing zone of the container to wedge the gasket between the side wall of the container and the skirt of the cap thereby to compress the gasket against the side wall thereof to provide a temporary seal readily formed without substantial sealing pressure and thereafter reforming portions of the cap to compress the gasket further and to render said temporary seal permanent.

2. The method of hermetically sealing closure caps having substantially rectangular beads in the skirts thereof and gaskets substantially rectangular in cross-section in said beads to glass containers having side wall sealing surfaces and tapered surfaces intermediate said sealing surfaces and the rims of the containers, which method comprises forcing downwardly a cap containing a gasket in the bead of the skirt onto the container, the gasket being smaller than the sealing zone of the container to wedge the gasket between the side wall of the container and the skirt of the cap to compress the gasket against the side wall thereof and to provide a temporary seal readily formed, and thereafter reforming the bead of the cap to compress the gasket further and to render said temporary seal permanent.

3. The method of hermetically sealing a closure cap having a gasket in the skirt thereof to a glass container having an annular bead on the side wall thereof, which method comprises forcing downwardly the cap containing the gasket in the skirt thereof onto the container and over the bead on the container, the gasket being smaller than said bead on the container to wedge the gasket between the beaded side wall of the container and the skirt of the cap thereby to compress the gasket against the side wall of the container and the bead thereon to provide a temporary seal readily formed, and thereafter reforming portions of the cap to compress the gasket further and to render said temporary seal permanent.

4. The method of hermetically sealing a closure cap having a gasket in the skirt thereof to a glass container having a side wall sealing surface, which method comprises forcing downwardly a cap containing a gasket in the skirt thereof onto the container while the cap and container are subjected to a partial vacuum, the gasket in the closure being smaller than the sealing zone of the container to wedge the gasket between the side wall of the container and the skirt of the cap thereby to compress the gasket against the side wall of the container to provide a temporary hermetic seal readily formed with a partial vacuum within the container and thereafter reforming the skirt of the cap under atmospheric conditions to form a permanent hermetic seal.

5. The method of hermetically sealing a closure cap to a glass container having a side wall sealing surface, which method comprises forcing downwardly a cap containing a gasket in the skirt thereof onto the container while the contents of the container are hot to create a partial vacuum in the container when the contents cool, the gasket being smaller than the sealing zone of the container to wedge the gasket between the side wall of the container and the skirt of the cap thereby to compress the gasket against the side wall of the container to provide a temporary seal readily formed and thereafter reforming portions of the cap to compress the gasket further and to render said temporary seal permanent.

6. The method of hermetically sealing a closure cap having a substantially rectangular bead in the skirt thereof and a rectangular gasket in said bead to a glass container having a side wall sealing surface, which method comprises placing the cap on the container and reforming the upper outer corner of said bead to eliminate said upper corner and to bring the sides forming the corner into a straight line to reform the gasket into a triangular shape and to compress the gasket against the side wall of the container to form a hermetic seal whereby the bead of the cap becomes an open-sided triangle with the lower side thereof forming the bottom of the cap and being substantially horizontal and with the open side thereof adjacent the side of the container to permit the gasket to engage the container.

7. The method of sealing a closure cap having a substantially rectangular bead in the skirt thereof and a rectangular gasket in said bead on a container having an annular sealing surface and an annular pry-off ledge below said sealing surface, which method comprises placing the cap on the container with the gasket in the bead, supporting the bottom of said cap and the lower side of said bead a slight distance from said annular ledge and reforming the upper outer corner of the bead in the cap to eliminate said corner and to bring the sides of the bead forming said corner into a straight portion extending substantially from the junction of the upper side of the bead with the skirt of the cap to the bottom of the cap.

8. A sealed package comprising a container, a closure cap having a cover portion and a depending skirt, a bead in said skirt substantially in the form of an open-sided triangle, the upper side of said bead forming in section substantially a straight line free from corners from the junction of the skirt of the cap with the upper side of the bead to the lower side of the bead, the lower side of the bead being substantially horizontal and constituting the bottom of the cap, and a gasket in said bead compressed into a triangular shape against the side wall of the container by said bead to form a hermetic seal.

9. A sealed package comprising a container having a sealing surface and an annular pry-off ledge below said sealing surface, a closure cap having a cover portion and a depending skirt, a bead in said skirt substantially in the form of an open-sided triangle, the upper side of said bead forming in section substantially a straight line free from corners from the junction of the skirt of the cap with the upper side of the bead to the lower side of the bead, the lower side of the bead being substantially horizontal and constituting the bottom of the cap, and a gasket in said bead compressed into a triangular shape against the side wall of the container by said bead to form a hermetic seal, the lower side of the bead being spaced slightly from the pry-off ledge to permit the cap to be pried off with a coin or similar device.

10. In combination, a container having a filling opening at its upper end and an external ledge on the container in proximity to the filling opening, a metal closure including a circular top portion fitting over the opening, a depending annular flange on the top portion adapted to fit over the upper end of said container, an external vertically collapsible bead encircling and forming a part of said flange, said bead disposed adjacent the lower margin of the flange and adapted when collapsed to overlie at least a major portion of the ledge and with the latter provide means whereby a prying implement may be inserted between the ledge and bead and used as a lever in removing the closure, and a sealing gasket carried by the closure and adapted to be compressed by collapsing said bead.

11. In combination, a container having a filling opening at its upper end and a continuous external ledge encircling the container in proximity to the filling opening, a metal closure including a circular top portion fitting over the opening, a depending annular flange on the top portion adapted to fit over the upper end of said container, an external vertically collapsible bead encircling and forming a part of said flange, said bead disposed in proximity to the lower margin of the flange and adapted when collapsed to overlie at least a major portion of the ledge and with the latter provide means whereby a prying implement may be inserted between the ledge and bead and used as a lever in removing the closure, and a sealing gasket carried by the closure and adapted to be compressed by collapsing said bead.

ABRAHAM PODEL.